Patented Nov. 6, 1945

2,388,278

UNITED STATES PATENT OFFICE 2,388,278

PRODUCTION OF HIGHLY POLYMERIC ORGANIC COMPOUNDS

Robert Wighton Moncrieff and Edward William Wheatley, Spondon, near Derby, England, assignors to Celanese Corporation of America, a corporation of Delaware No Drawing. Application April 5, 1941, Serial No. 387,064. In Great Britain April 25, 1940

2 Claims. (Cl. 260—78)

This invention is concerned with improvements in or relating to the production of organic compounds and particularly to the production of highly polymeric compounds suitable for the production of filaments, foils and other shaped articles.

In recent years much interest has been shown in the production of highly polymeric compounds, suitable for the production of artificial filaments and other shaped articles, from starting materials of low molecular weight. The starting materials employed usually contain two reactive radicles. The production of the compounds is generally effected by heating either a single compound containing two radicles capable of reacting with each other, for example an amino-carboxylic acid, or a mixture of two compounds each containing two reactive radicles capable of reacting with the radicles in the other compound, for example a mixture of a dicarboxylic acid and a diamine. Heating is usually effected in the presence of another substance which is a solvent for the starting materials and for the polymeric products, for example cresol or xylenol. At the conclusion of the heating operation, when a polymer has been produced which has a sufficiently high molecular weight to yield filaments or other shaped articles, a reaction mass containing the polymer and the solvent is obtained which is fluid at the high reaction temperature employed, which may for example be 250° C. or more, but which is solid at normal temperatures or even at temperatures considerably higher than normal.

The precipitation of a substance by pouring a solution which is at a temperature of perhaps 250° C. or more into a non-solvent is of course an operation which is attended by considerable difficulties. Moreover, it has been found that when precipitation is carried out in this manner the viscosity of the polymer, determined for example by dissolving it in a suitable solvent and timing the rate of flow of the solution through a viscometer, is considerably lower after precipitation than prior to precipitation. This decrease in viscosity may be so great that it is extremely difficult or even impossible to obtain by this method of precipitation a polymer having a sufficiently high viscosity to yield satisfactory filaments or other shaped articles.

Even when polymerisation is effected in the absence of a solvent it is desirable to dissolve and reprecipitate the polymer in order to separate it from any by-products formed during polymerisation and to obtain it in a physical condition suitable for further treatment, and the difficulties referred to above are of course met with in this case also.

It has now been discovered that the separation of polyamides and other highly polymeric compounds from the reaction mass obtained at the conclusion of the polymerisation process may be effected without reducing the viscosity of the polymers, at least to any substantial extent, by treating the mass, preferably after cooling, with a liquid which is a solvent at atmospheric temperature for the polymer which is contained in the mass, treatment being continued until the polymer is dissolved and then precipitating the polymer, if necessary after filtering the solution, by mixing the solution with a liquid which is a non-solvent for the polymer and is miscible with the solvent present in the solution, both the solution and the non-solvent being at a relatively low temperature, e. g. atmospheric temperature or 40° or 60° C. up to about 100° C.

In order to accelerate solution of the reaction mass it may be broken up into small pieces before it is introduced into the solvent.

The liquids employed for solution and precipitation will depend upon the solubility properties of the polymer which is being treated. Liquids which are in general suitable as solvents, particularly for polyamides which are one of the most important classes of polymers, include lower aliphatic acids, for example acetic acid and particularly formic acid, and aqueous solutions of mineral acids, particularly hydrochloric and sulphuric acids. For example, a cold concentrated aqueous solution of formic acid may be employed or a solution containing about 15–20% of hydrochloric acid or 30–40% of sulphuric acid. When mineral acid solutions are employed to dissolve a polymer prepared in the presence of an organic substance such as phenol or cresol it is generally desirable to replace part of the water present in the mineral acid solution by acetone, alcohol or other water-miscible liquid which is a solvent for the substance in order to obtain a satisfactory solution. Other liquids which may be employed as solvents are halogenated phenols, for example ortho chlorphenol. Liquids employed in the production of the polymers, for example cresol and xylenol, may also be employed to dissolve up the reaction mass but it has been found that in general the physical condition of the precipitated polymer is less satisfactory than when an acid such as formic acid or hydrochloric acid is employed.

The non-solvent used may be water or an organic liquid such as acetone or alcohol but in general the best results are obtained by the use of aqueous solutions of organic liquids, for example a 50% aqueous solution of acetone. Solutions of this character, which have a less vigorous precipitating action than water alone, precipitate the polymer in a better physical condition, particularly as regards the ease with which it dissolves and the readiness and uniformity with which it melts, and are therefore particularly useful.

After precipitation the polymer is thoroughly washed with water or other suitable non-solvent and preferably also with a dilute solution of ammonia or other alkali, when it has been precipitated from an acid solution. It is then dried at a low temperature, for example about 100 to 110° C. It may then be employed for the production of artificial filaments, foils or other shaped articles. for example by extruding a solution of it into a coagulating bath or evaporative medium or by a melt-spinning process in which the articles are produced from the molten polymer.

The present invention is applicable generally to the precipitation of polyamides, polysulphonamides, polyureas and other highly polymeric compounds from reaction masses obtained at the completion of the polymerisation processes.

The following examples are given to illustrate the present invention:

Example 1

The reaction means obtained by the polymerisation of hexamethylene diamine and adipic acid in the presence of mixed xylenols is allowed to cool, broken up, dissolved in 85% formic acid and then precipitated by pouring the solution into about 5 to 10 times its volume of 50% aqueous acetone. The polymer is obtained in a granular form and after separation from the liquor it is washed by boiling in several quantities of water and then in boiling acetone and is finally filtered off and dried. It is thus obtained in a finely divided condition which renders it possible to melt it readily and uniformly for the production of filaments, films and the other articles by a melt extrusion process.

Example 2

The reaction mass obtained by polymerising hexamethylene diamine and adipic acid in the presence of phenol is agitated in about 3 or 4 times its volume in a mixture consisting of 50% concentrated hydrochloric acid and 50% of acetone until it dissolves. This solution is then poured into the 50% aqueous solution of acetone and the precipitated polymer washed and dried as described in the previous example.

Having described our invention, what we desire to secure by Letters Patent is:

1. Process for the separation of the polyamide resulting from the polymerization of hexamethylene diamine and adipic acid from the solid reaction mass obtained from completion of the polymerization, which comprises dissolving the solid polymerized carboxylic acid amide in a liquid which is a solvent therefor at atmospheric temperature and which comprises formic acid, separating any undissolved substances from the solution and then precipitating the polyamide in a particulate form by mixing the solution with an aqueous solution of an organic liquid, which solution is a non-solvent for the polyamide and is miscible with the solvent present in the solution, both the solution and the non-solvent being at a temperature below 100° C.

2. Process for the separation of the polyamide resulting from the polymerization of hexamethylene diamine and adipic acid from the solid reaction mass obtained upon completion of the polymerization, which comprises dissolving the solid polymerized carboxylic acid amide in a liquid which is a solvent therefor at atmospheric temperature and which comprises formic acid and then precipitating the polyamide in a particulate form by mixing the solution with an aqueous solution of acetone at a temperature below 100° C.

ROBERT WIGHTON MONCRIEFF.
EDWARD WILLIAM WHEATLEY.